United States Patent [19]

Anderson, Jr.

[11] 4,162,745
[45] Jul. 31, 1979

[54] SUBSTANTIALLY DRIP-PROOF PROBE FOR EXTRACTING TOXIC FLUIDS FROM HERMETICALLY SEALED CONTAINERS

[76] Inventor: David L. Anderson, Jr., 23799 Monterey, Salinas Hwy. Unit #51, Salinas, Calif. 93901

[21] Appl. No.: 840,973

[22] Filed: Oct. 11, 1977

Related U.S. Application Data

[63] Continuation-in-part of Ser. No. 807,823, Jun. 20, 1977, Pat. No. 4,108,336.

[51] Int. Cl.$^2$ .................... B08B 3/02; B08B 9/08; B67D 5/02
[52] U.S. Cl. ............................ 222/148; 134/168 R; 137/240; 137/577; 222/400.7; 222/464
[58] Field of Search ......... 285/12; 134/168 R, 169 R; 137/212, 240, 577, 318; 222/148, 151, 400.7, 400.8, 394, 464, 538, 382, 383

[56] References Cited

U.S. PATENT DOCUMENTS

| 1,521,668 | 1/1925 | Bond | 137/577 X |
| 2,044,594 | 6/1936 | Scholfield | 222/383 UX |
| 2,765,092 | 10/1956 | Rice | 137/212 X |
| 3,348,734 | 10/1967 | Rice et al. | 222/400.7 X |
| 3,490,483 | 1/1970 | Nicko | 137/212 |
| 3,916,924 | 11/1975 | McGowan | 134/168 R X |

FOREIGN PATENT DOCUMENTS

| 668674 | 11/1938 | Fed. Rep. of Germany | 137/318 |
| 1191066 | 10/1959 | France | 285/12 |
| 120106 | 11/1947 | Sweden | 222/464 |

*Primary Examiner*—David A. Scherbel
*Attorney, Agent, or Firm*—Huebner & Worrel

[57] ABSTRACT

A drip-proof probe characterized by a telescopic stinger adapted to be connected with a closed system, inserted into a shipping container for toxic fluid for sequentially extracting the fluid from the container and delivering the fluid to the closed system, and thereafter employed for rinsing residue from the container, all without subjecting handlers to contamination through spillage or inhalation.

15 Claims, 13 Drawing Figures

SUBSTANTIALLY DRIP-PROOF PROBE FOR EXTRACTING TOXIC FLUIDS FROM HERMETICALLY SEALED CONTAINERS

This application is a continuation-in-part application of Application Ser. No. 807,823, filed June 20, 1977, now U.S. Pat. No. 4,108,336.

BACKGROUND OF THE INVENTION

1. Field of the Invention

The invention generally relates to a device adapted to be employed in opening and closing the discharge orifice of a sealed container, and more particularly to an improved drip-proof probe for sequentially extracting toxic liquid from a shipping container and washing residue of the toxic fluids therefrom.

As is more fully discussed in U.S. Pat. No. 3,923,203, to David L. Anderson, Jr., incorporated herein by reference thereto, in the field of agriculture, large acreages must be treated through an application of suitably diluted toxic chemicals, commonly referred to as Ag chemicals, for effectively destroying noxious plants, insects, and the like. As also therein disclosed, it is a common practice to transport toxic chemicals in a concentrated liquid form to or near a situs of use and thereafter to dilute the toxic chemical by employing water and the like. Normally, such chemicals are transported in an original shipping container from which the chemicals are extracted and introduced into a mixing system within which the chemical is mixed with water or some other suitable carrier.

2. Description of the Prior Art

Mixing of the chemicals often is achieved through a use of mixing tanks and the like within which a diluting fluid, such as water, is thoroughly mixed with the toxic chemical. Unfortunately, as can readily be appreciated by those familiar with use of toxic Ag chemicals, contamination resulting from spillage and the like may result in a handler being seriously or even fatally injured.

In order to avoid apparent dangers attending the handling of Ag chemicals, substantial interest has been shown in the design of and use of closed systems which can be employed by workers in the mixing of toxic chemicals without being subjected to contamination resulting from dermul contact and/or inhalation.

While various systems have been proposed, such as the system disclosed in the aforementioned United States Letters Patent, and the probe disclosed and claimed in the aforementioned application, of which this application is a continuation-in-part, efforts are continuing to provide systems which are economic to fabricate, simple and reliable to employ.

For example, it has been found to be highly desirable, for numerous reasons, to provide a probe which may, in use, be inserted into a substantially sealed container for extracting therefrom the contents thereof and thereafter employ the probe in washing the residue of the contents from the container. Moreover, for similar reasons, such a probe should have a capability for avoiding unwanted discharge from the lines connected thereto, once the probe is disconnected from the container, as well as for preventing a dripping of liquids from those surfaces previously exposed to toxic fluids of the container.

It is therefore a general purpose of the instant invention to provide a substantially drip-proof probe adapted to be inserted to a substantially sealed original shipping container for toxic fluid of a type frequently referred to as an Ag chemical, and employed for sequentially extracting toxic fluid from the container and washing toxic residue of the fluid from the internal surfaces of the container, whereby handlers of the toxic fluid are substantially protected from contamination resulting from contact and inhalation.

OBJECTS AND SUMMARY OF THE INVENTION

It is an object of the instant invention to provide a substantially drip-proof probe for use in mixing liquid chemicals.

Another object is to provide a probe for removing Ag chemicals in liquid form from original shipping containers without subjecting handlers to contamination.

It is a further object to provide a probe for removing liquid chemicals from original shipping containers characterized by measuring means calibrated to the smallest unit in which the liquid is being measured.

It is still another object to provide a probe which facilitates extraction of liquid chemicals from original shipping containers and a removal from the containers before the containers have been emptied of their content.

It is a further object to provide a probe for removing liquid chemicals from original shipping containers characterized by a substantially drip-proof stinger, whereby drippage shall not exceed two milliliters per disconnect.

It is another object to provide for use with a closed system characterized by container-rinse couplings, a probe including means for spray rinsing the internal surfaces of original shipping containers in a manner such that the container rinse ultimately is delivered to a mix tank via the closed system.

Another object is to provide for use with a closed system a probe including means for continuing a rinsing of the inner surfaces of original shipping containers for liquid agricultural chemicals until a minimum of one-half of the container volume or ten gallons, whichever is less, of rinse solution has been used.

It is still another object to provide in a probe for use in extracting liquid chemicals from original shipping container means for removing liquid rinse fluids from the containers concurrently with the introduction thereof.

It is still another object to provide in a probe for a closed system adapted to be employed in extracting liquid chemicals from an original shipping container a pressure-relief valve for avoiding a build-up of excessive pressure within the container.

It is a further object to provide a probe having a stinger for use in extracting toxic liquid chemicals from shipping containers characterized by flexible pouring spouts adapted to be coupled with the spouts as the stinger is inserted therethrough into the containers, and thereafter uncoupled from the spouts subsequent to a withdrawal of the stinger therefrom.

It is another object to provide for a probe an improved, substantially drip-proof stinger adapted to be inserted into a substantially sealed container and employed for sequentially extracting toxic fluid from the container and thereafter washing residue from the internal surface thereof.

It is another object to provide for a probe a simplified, economic and practical drip-proof stinger particularly suited for use in environments in which toxic liquid Ag chemicals are extracted from containers and the containers thereafter are rinsed, all without subjecting handlers to contamination or ingestion of toxic chemicals or fumes.

It is another object to provide a substantially drip-proof probe adapted to be inserted into a container for toxic chemicals of variable sizes having variably dimensioned discharge orifices, while maintaining a substantial seal as the contents are extracted from the container and the residue thereafter removed employing a rinsing liquid.

It is another object to provide a probe for use in extracting from original shipping containers Ag chemicals in toxic liquid form although not necessarily restricted in use thereto since the probe may be similarly useful in extracting liquids of a general nature from containers characterized by a pouring spout.

These and other objects and advantages are achieved through a substantially drip-proof probe adapted to be coupled with a pouring spout of a container and characterized by a stinger adapted to be inserted into the container and employed for extracting fluid from the container, washing residue of the fluid from the internal surfaces of the container and extracting rinsing fluid and residue from the container, all without subjecting handlers to contaminating effects of the liquid, as will become more readily apparent by reference to the following description and claims in light of the accompanying drawings.

DESCRIPTION OF THE PREFERRED EMBODIMENT

First Form

Figure 1:
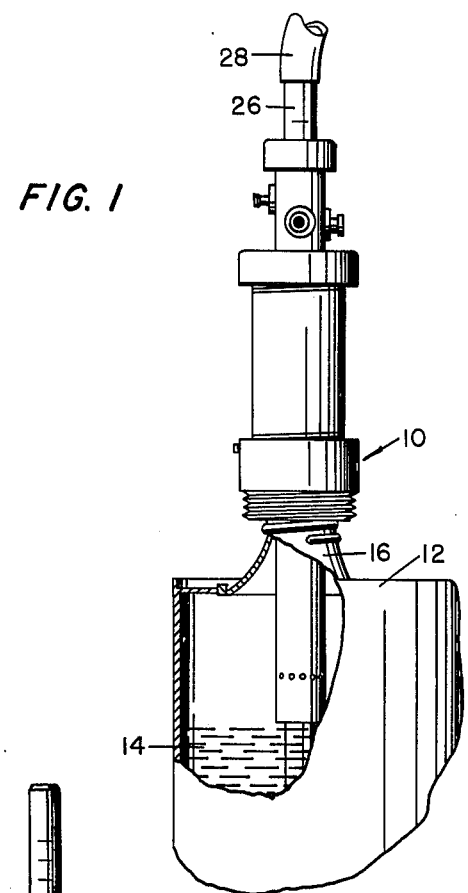
FIG. 1 is a fragmented view illustrating a drip-proof probe embodying the principles of the instant invention connected in an operative environment.

Referring now to the drawings, with more particularity, wherein like reference characters designate like or corresponding parts throughout the several views, there is shown in FIG. 1 a probe, generally designated 10, embodying the principles of the present invention.

As shown, the probe 10 is seated in a container 12 confining therein a body of liquid, designated 14. While the body of liquid 14 may be of any chemical composition, it is to be understood that the probe 10 comprises a drip-proof probe particularly suited for use in handling toxic liquids such as Ag chemicals and the like.

Figure 7:
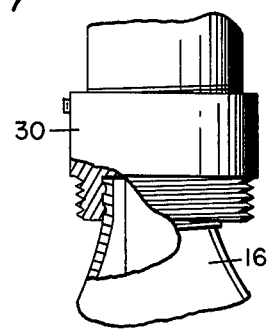
FIGS. 7, 8, 9, 10, 11 and 12 illustrate devices provided for connecting the probe with containers of different sizes having differently dimensioned and configured pouring spouts, as are commonly found in the trade.

The container 12, as shown, is fabricated from any suitable material, such as sheet metal, and includes a flexible pouring spout 16 through which the body of liquid 14 is discharged from the container 12. As shown in FIGS. 1 and 7, the spout 16 comprises a spout frequently referred to as a Rieke spout. As such, the spout 16 includes about its periphery a helical thread for receiving a closure cap, not shown, and is adapted to be pressed downwardly into a collapsed, retracted configuration for accommodating a shipping of the container, as well as to be lifted and extended above the end surface of the container, not designated, and employed in a "pouring" configuration. In any event, as shown in FIGS. 1 and 7, the spout through which the probe 10 is in operation inserted comprises a flexible spout having formed about its periphery a screw thread, whereby the spout is adapted to be received in screw threaded engagement with the probe.

As will hereinafter becme more readily apparent, however, the spout 16 may be of any suitable configuration and of rigid construction. Of course, when a container equipped with a Rieke spout, as shown in FIG. 1, the probe 10 is afforded motion accommodated by the flexibility of the spout. Such motion will facilitate and enhance manipulation of the probe 10 when circumstances dictate that the probe 10 be afforded pivotal motion.

Figure 2:
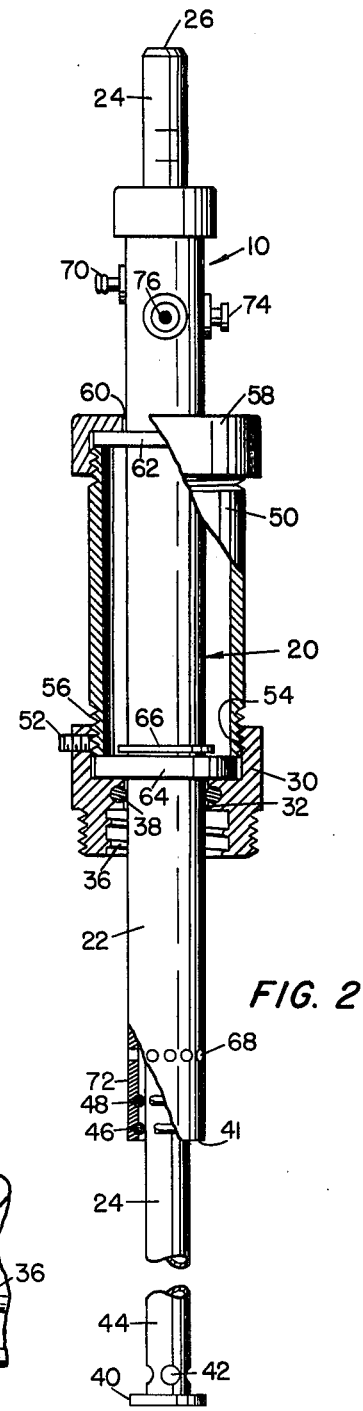
FIG. 2 is a partially sectioned, elevational view of the probe shown in FIG. 1 extended to a fully extended configuration.

In any event, as best illustrated in FIG. 2, the probe 10 includes a telescopic stinger, generally designated 20, which includes a first tubular segment 22 and a second tubular segment 24. As shown, the first segment 22 of the stinger 20 is of an elongated tubular configuration and serves to receive the second segment 24 in a telescopic relationship, whereby extension and retraction of the second segment relative to the first segment is facilitated.

It also is important to note that the second segment 24 includes an upper end portion 26 adapted to be received within an end portion of a length of tubing 28 FIG. 1. It is to be understood that the length of tubing 28 is provided for coupling the probe 10 with a closed mixing system, not shown. Since the particular mixing system with which the probe 10 is adapted for use forms no specific part of the instant invention, a detailed description thereof is omitted in the interest of brevity. However, as currently employed, the tubing 28 serves to couple the probe with a mixing system such as the system illustrated in U.S. Pat. No. 3,913,606.

Referring again to FIG. 2, it can be seen that the stinger 20 is supported by a collar 30, the purpose of which is to connect the probe to the container. The collar includes a bore 32 extended axially therethrough. The collar 30 also includes an axial bore defining a chamber 34, FIG. 3, arranged in coaxial relation with the bore 32. It is to be understood that the internal surface of the chamber 34 also includes a helical thread 36 configured and pitched to receive the helical thread of the pouring spout 16. Therefore, it should be apparent that the collar 30 is adapted to be mated with the container 12 simply by threading the collar 30 into a fitted relationship with the spout 16.

Additionally, within the collar 32 there is an annular seal 38 seated in a suitable groove, not designated. The seal 38 comprises an O-ring seal which engages the external surface of the first segment 22 of the stinger and establishes a seal about the periphery thereof. However, it is also to be understood that the first segment 22 of the stinger 20 is axially displaceable within the bore 32. Consequently, the annular seal 38 functions to maintain the stinger in an hermetically sealed relationship with the collar 30.

In view of the foregoing it should now be apparent that upon being connected with the pouring spout 16 the collar 30 serves as a mount for supporting the stinger 20 for axial displacement along the axis of the pouring spout 16. Moreover, it should be appreciated that since the second segment 24 is supported for telescopic motion relative to the first segment 22, the segment 24 can be retracted relative to the first segment 22 of the stinger, FIG. 3, as well as extended, as shown in FIG. 2.

Figure 3:
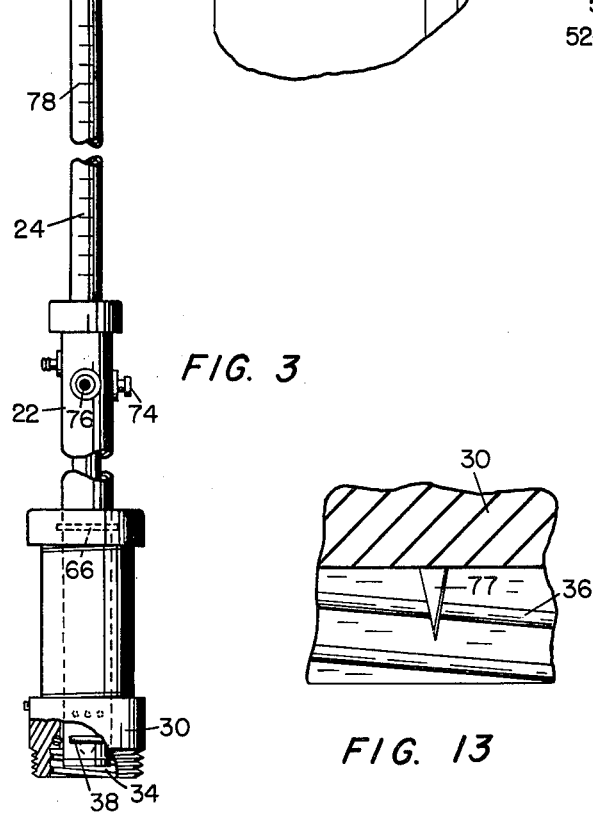
FIG. 3 is a partially sectioned view of the probe shown in FIGS. 1 and 2, retracted to a fully retracted configuration.

In order to limit retraction of the segment 24, relative to the segment 22, an end cap 40 of a disc-shaped configuration is fitted to the lowermost end of the segment 24 of the stinger. This cap is adapted to abut the annular end surface, designated 41, of the first segment 22 of the stinger. Thus the cap is adapted to function as a stop member. Hence, upon tension being applied to the upper end portion 26 of the second segment 24 of the stinger 20, the segment 24 is retracted until the end cap 40 engages the end surface 41 of the segment 22, as best illustrated in FIG. 3. Similarly, it also is important to note that since the segment 22 is supported for axial displacement relative to the bore 32, the stinger 20, including segments 22 and 24 are retracted relative to the chamber 34, as also best illustrated in FIG. 3, in response to a continued application of tension to the upper end portion 26 of the segment 24.

At this juncture, it is noted that one end portion of the second segment 24 is provided with an annular array of extraction ports 42. These ports are radially extended and communicate with a conduit 44 defined by the tubular interior of the segment. Hence, the exterior of the segment 24 communicates with the tubing 28 via the conduit 44 and the ports 42.

It is important to appreciate that the array of extraction ports 42 are positioned in close proximity with the end cap 40 and that within the adjacent end portion of the first segment 22 there is provided a pair of axially spaced seals 46 and 48. The seals 46 and 48, as shown, comprise O-ring seals seated in suitable grooves, not designated. These seals are axially spaced a distance such that as the segment 24 of the stinger is retracted relative to the segment 22 a distance sufficient for causing the end cap 40 to engage the end surface 41, the seals 46 and 48 are positioned at opposite sides of the ports for thus forming an hermetic seal. Due to the hermetic seal formed at opposite sides of the ports 42 the ports are isolated from the exterior of the segments 22 and 24. Consequently, the seals 46 and 48 function, in effect, to close and seal the ports 42 against passage of fluid therethrough. As a practical matter, in order to protect the seal 46, it is preferred that the extraction ports 42 be slightly chamfered or beveled in order to remove therefrom sharp edges and burrs which otherwise could be expected to score and thus damage the surface of the seal 46.

Returning now to FIG. 3, it can be seen that upon being retracted relative to the segment 22, the surface of the segment 24, previously extended from the segment 22, is effectively sealed in an encased relation with the first segment. Hence, retraction of the segment 24 relative to the segment 22 of the stinger 20 serves to encapsulate and thus isolate the external surface of the segment 24 as well as to close the extraction ports 42 and thus isolate the interior of the segment. Consequently, the surface of the segment 24 bearing residue of toxic chemicals is shielded from contact following separation of the probe from the container. Additionally, as will hereinafter become more readily apparent, the external surface of the segment 24 may be readily rinsed following extraction of the segment from the container, where so desired.

Referring again to FIG. 3, it is apparent that the lowermost end portion of the segment 22 also may be retracted relative to the collar 30, as desired. Moreover, such retraction assures that the end portion thereof previously extended from the collar 30 into the container is retracted therefrom. Thus the stinger 30 is supported to be extended and retracted into the container 12 via the pouring spout 16.

In practice, a protective barrel 50 coaxially aligned with the bore 32 is mated with the collar 30, at the side thereof opposite the chamber 34. Preferably the barrel 50 is secured to the collar through a use of a set screw 52 and an internally threaded chamber 54. This chamber is configured to receive a threaded end portion 56 of the barrel 50, while the set screw 52 is employed to assure that rotary motion of the barrel 50 relative to the collar 30 is precluded.

It is noted that the barrel 50 is closed by an annular cap 58 suitably coupled with the barrel, as through a use of mated threads and the like. The cap 58 includes a concentric bore 60 through which extends the upper end portion 26 of the first segment 22 of the stinger 20. A seal 62 is seated in coaxially aligned relation with the bore 60. Similarly, a seal 64 is provided in coaxial alignment with the bore 32 of the collar 30. Consequently, the external surface of the first segment 22 is circumscribed by the seals 62 and 64. While these seals are of any suitable type it is preferred that the seals be adapted to perform a wiping function as the segment 22 is extended and retracted relative to the collar 30.

As is also illustrated in the drawings, an annular snap ring 66 seated in a suitable groove formed about the periphery of the first segment 22 of the stinger 20 is provided. This ring functions as a stop member for limiting the throw of the segment 22 of the stinger 20, relative to the collar 30. This function is achieved as the ring is caused to seat against the wiper seals 62 and 64. Consequently, the seals 62 and 64 are suitably formed and seated for purposes of accommodating the abuse to which the seals may be expected to be subjected during normal usage. In practice, the length of the barrel 50 is such as to accommodate axial travel of the snap ring 66 through a distance sufficient to afford complete extension of the segment 22 relative to the collar 30, as well as afford complete retraction of the stinger 20 from a container 12 to which the probe 10 is attached.

Referring again to FIG. 2, it can be seen that the first segment 22 also is provided with an annular array of ports 68. These ports are adapted to function collectively as a spray nozzle for directing a disc-shaped jet of a rinsing fluid to impinge upon the internal surfaces of the container 12 once extraction of the body of fluid 14 from the container has been completed. Where so desired, water is employed as a rinsing agent, however, other suitable agents are employed as desired.

Figure 4:
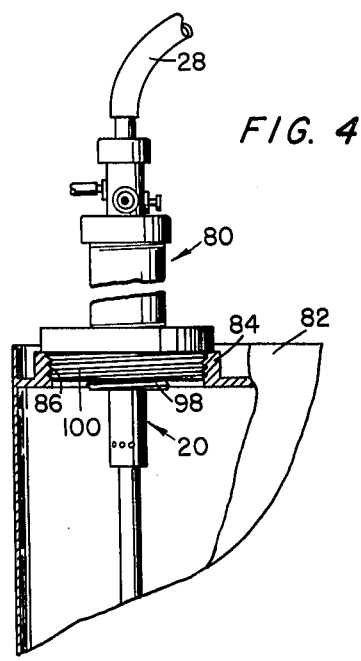
FIGS. 4, 5 and 6 collectively illustrate an alternate embodiment of the invention.

In order to facilitate delivery of a rinsing fluid, such as water, to the ports 68 the uppermost end portion, not designated, of the first segment 22 of the stinger 20 is provided with a fitting 70. While not illustrated, it is to be understood that the fitting 70 is detachably connected through a length of flexible tubing with a suitable source of water, or other rinsing fluid to be expelled from the stinger 20 for purposes of washing-down or rinsing residue from the internal surface of the container 12. Since the design and construction of the fitting 70 is varied, as desired, a detailed description thereof is omitted in the interest of brevity. A simple nipple-like fitting adapted to receive an end portion of a flexible tubing in friction fit, disconnectable engagement is employed where desired, as illustrated in FIG. 4. The fitting 70 communicates with ports 68 via a jacket 72 established between the adjacent surfaces of the segments 22 and 24. Hence, it will be appreciated that water or other fluid introduced into the jacket 72 under pressure will be discharged from the ports 68 as streams of droplets to impinge against the internal wall of the container 12.

Moreover, it should now be clearly understood that in the event the second segment 24 is retracted relative to the first segment 22 of the stinger 30 as a rinsing fluid, such as water, is caused to flow through the jacket 72. The external surface of the stinger is rinsed as the rinsing fluid moves along the surface of this segment of the stinger, prior to its being discharged from the nozzle defined by the ports 68. Consequently, while the seals 46 and 48 can be relied upon to perform a suitable wiping function, the jacket 72 is, where desired, employed in a manner which serves rinse residue from the external surface of the segment. Thus decontamination of the external surface of the segment 24 is assured. In practice, this step is eliminated, where desired, since the segment 22 is encased in the segment 24 upon being fully retracted, and the O-rings 46 and 48 perform a wiping function during retraction of segment 22.

At this juncture it is imperative to note that, where desired, a pressure relief valve 74 is mounted on the upper end portion of the first segment 22 of the stinger 20. This valve is of any suitable design and communicates with the ports 68 via the jacket 72. Consequently, in the event pressure greater than the selected pressure developes within the container 12 as extraction of fluid and rinsing of the container occurs, the pressure relief valve 74 accommodates a discharge of the pressure to the atmosphere. Additionally, it should be apparent that where so desired, a further pressure relief valve 76 is mounted on the second segment 22, in communication with the jacket 72 and employed for accommodating an introduction of atmospheric pressure into the container 12. Hence, it is possible to prevent an establishment of an excessive vacuum within the container as fluid from the body 14 is extracted therefrom.

In many instances, however, pressure relief valve 74 and/or 76 is omitted, particularly where the fitting 70 and/or the segment 24 is open to the atmosphere during extraction of fluid from the container. Such may be achieved where a flexible conduit is provided for coupling the fitting 70 and/or segment 24 to a valve adapted to introduce atmosphere or relieve pressure. Such valves are typified by three-port two position valves.

Figure 13:
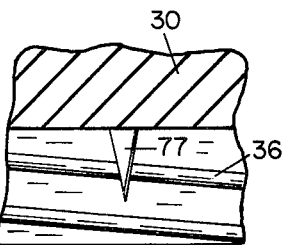
FIG. 13 comprises a fragmented view of a modified probe illustrating a knife adapted to be employed in opening a container to which the probe is connected.

Reference is now made to FIG. 13 particularly wherein is illustrated a modified form of the collar 30. This form of the collar includes a protuberance forming a knife 77 of an acuminate configuration. The knife is extended downwardly into the chamber 34 in radially spaced relation with the axis of the chamber to a plane slightly below the cap 40 when the segment 24 is retracted relative to the segment 22. The knife 77 functions to cut a circular opening in the upper end of the spout 16 as the collar 30 is rotated for purposes of mating the collar with the spout. Hence, once a probe 10 is mated with the spout 16 having a collar 30, modified as described, an opening is formed in the end of the spout for facilitating an introduction of the stinger 30 into the container 14.

In instances where the knife 77 is omitted from the collar 30, blades and the like are employed in a known manner for puncturing the sealing membrane normally provided beneath closure caps for spouts of shipping containers.

As best illustrated in FIG. 3, where so desired, a scale 78 is marked along the upper surface of the first segment 22 for purposes of providing adequate measurements of pesticide be used. In practice, the scale is calibrated to the smallest unit in which the body of fluid, or Ag chemical, is being measured. Simply by observing the relation of the scale to the upper end of the segment 22, when the level of the body of liquid 14 falls below the ports 42, it is possible to determine the quantity of the body 14 remaining in the container. Since the scale 78 need not pass through O-ring seals 46 and 48, inclusion of the scale along the surface of the upper end portions 26 of the second segment 24 normally does not introduce additional maintenance problems of significance. Moreover, the scale 78 simply is omitted where so desired.

Figure 8:
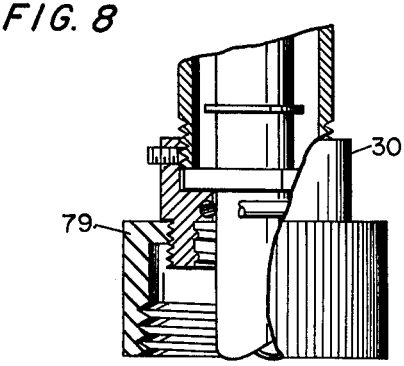

As best shown in FIG. 8, where desired, the external surface of the collar 30 is provided with a helical thread adapted to be received within a bore concentrically related to an adapter, designated 79. The adapter 79, as best illustrated in FIG. 8, facilitates a coupling of the collar 30 with a pouring spout of a different configuration and dimension. As a practical matter, as many adapters 79 are employed as is found necessary to fit pouring spouts of dimensions commonly encountered. Interchangeability of the adapter 79 is facilitated by an external thread, not designated, provided along the external surface of the collar 30 and a matching thread, also not designated, extended along the internal surface of the bore of the adapter.

In view of the foregoing, it is believed to be apparent that the probe 10 is in operation connected with a container 14 by mating the collar 30 with the spout 16, as illustrated in FIG. 7. Thereafter the stinger 20 is inserted downwardly through the bore of the pouring spout by extending the first segment 22 downwardly through the collar 30 and, subsequently, extending the second segment 24 downwardly with respect to the first segment 22. In instances when the scale 78 is employed, the second segment 24 is extended a distance indicated by the scale 78 to be sufficient for extracting a desired quantity of the body of fluid 14. Thus the probe 10 is readied for operation.

Second Form

Figure 5:
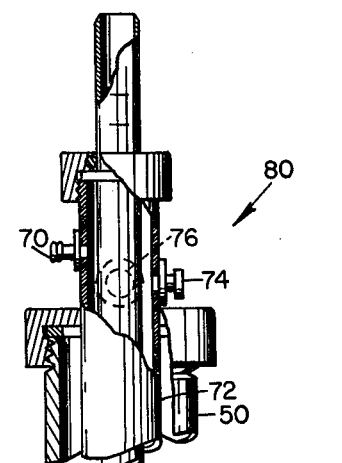
Figure 6:
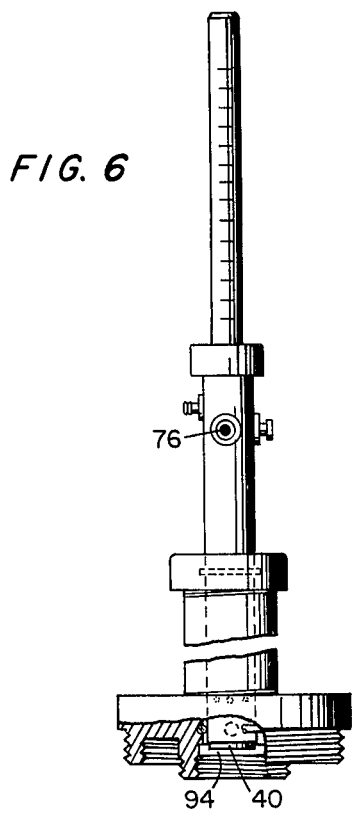

The form of the invention shown in FIGS. 4, 5 and 6 is provided with substantially the same basic structural components as is the form illustrated in FIGS. 1, 2 and 3. Therefore, common and corresponding elements are similarly numbered.

Referring first to FIG. 4, there is shown a probe 80 connected with a container designated 82. As shown, the probe 80 is inserted into a bung including a pouring spout designated 84. The pouring spout 84 comprises a substantially rigid sleeve having an internal thread 86.

As shown in FIGS. 5 and 6, the probe 80 also includes a stinger generally designated 20 which also includes a first segment 22 and a second segment 24 telescopically received within the first segment. Since the stinger 20 is similar in design and function to the stinger previously described with respect to the probe 10, a detailed description of this stinger is omitted in the interest of brevity.

It is important to note, however, that the collar 30, as previously described, is omitted for the probe 80 and in lieu thereof a universal coupling comprising a disk 90 is provided for supporting the stinger 20 in a coupled relationship with the spout 84. The disk 90, as shown, includes a blind bore 92 having an internal thread extended along its surface and configured to mate with an external thread 56 provided for the end portion of the barrel 50. Thus the disk 90 is adapted to receive the end of the barrel 50 in a coupled relationship.

Additionally, the disk 90 includes a chamber 94 the purpose and function of which is to receive the end portion of the stinger 20 is substantially the same manner in which the end portion of the stinger is received within the chamber 34 of the collar 30. It should now be apparent that the probe 80 is supported by the disk 90 in substantially the same manner as the stinger 20 is supported by the collar 30 and that the related and similarly numbered components function in substantially the same manner to achieve substantially the same results. However, it is important to note that the disk 90 also accommodates a coupling of the stinger 20 of the probe 80 with pouring spouts of different dimensions and configurations. To this end, the disk 90 is provided with a first sleeve 96, the internal surface of which defines the chamber 94. This sleeve is threaded along the internal as well as the external surfaces thereof. While the internal thread is not designated it is adapted to mate with an external thread of a pouring spout, FIG. 9. It is noted that the external thread, designated 98, is adapted to be seated within an internally threaded bore of a pouring spout for a given container, FIG. 10. Additionally, a sleeve 100 concentrically related to the sleeve 98 is provided with an internal thread 102 while the external surface of the sleeve is provided with the thread 86 aforementioned, as illustrated in FIG. 4. Thus the disk is adapted to be mated with both internally and externally threaded pouring spouts, as depicted in FIGS. 11 and 12.

Figure 9:
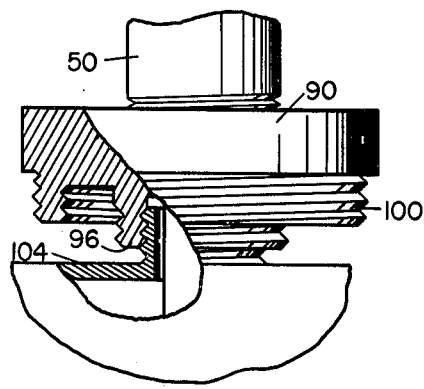
Figure 10:
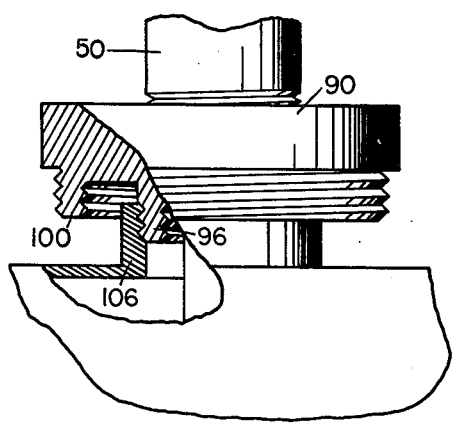
Figure 11:
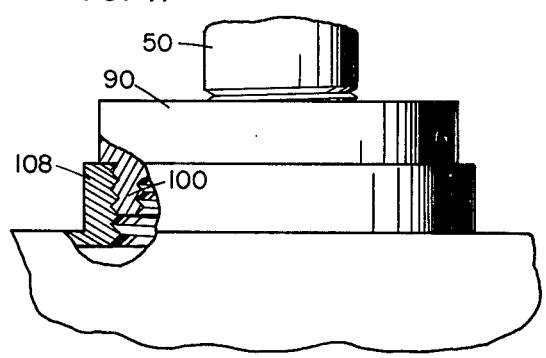
Figure 12:
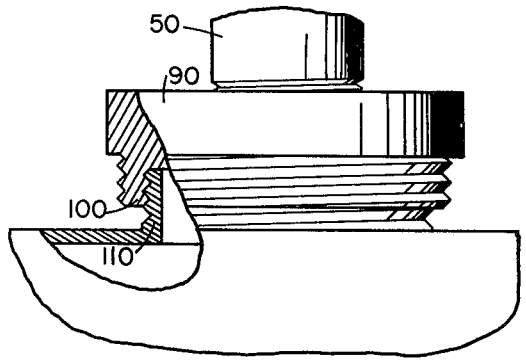

Referring summarily to FIGS. 9, 10, 11 and 12, it can be seen that the sleeve 96 provides a suitable mechanism through which the probe 80 is connected with a pouring spout, designated 104, FIG. 9, having an outside dimension substantially equal to the inside dimension of the internally threaded sleeve 96. With respect to FIG. 10, it can be seen that the sleeve 96 provides a suitable mechanism for connecting the probe with pouring spout 106 having an internal diameter substantially equal to the outside diameter of the sleeve 96. As illustrated in FIG. 11, the sleeve 100 provides a suitable mechanism for coupling the probe 80 with a pouring spout 108 having an internal diameter substantially equal to the external diameter of the sleeve 100. Finally, the sleeve 100, as illustrated in FIG. 12, provides a suitable mechanism for connecting the probe with a pouring spout 110 having an outside diameter substantially equal to the inside diameter of the sleeve 100.

OPERATION

It is believed that in view of the foregoing description, the operation of the device is completely understood. However, in the interest of completeness the operation will be briefly reviewed at this point.

Since the probes 10 and 80 differ primarily in the structure provided for coupling the probes with pouring spouts of different sizes and configurations, it is believed that a discussion of an operation of the probe 10 will provide for a complete understanding of the invention. It will, of course, be understood that while the probe 10 is described as being connected with a pouring spout 16 employing the collar 30, or an adapter 79 provides therefor, the probe 80 is coupled with pouring spout employing a disk 90 having multiple concentrically related sleeves dimensioned and configured to receive therein pouring spouts of substantially rigid configurations and of different dimensions. However, once coupled through a given container the probes 10 and 80 function in substantially the same manner for achieving substantially the same result.

In order to couple the probe 10 with the container 12, the pouring spout 16 is elevated and the end thereof exposed. Where a knife 77 is employed, a circular opening is established as the collar 30 is rotated relative to the spout for uniting the spout with the collar 30. However, in the event a knife 77 is not employed, the end of the spout is opened using manually operated tin snips, a so-called pocket knife, or similar instrument, prior to coupling the collar 30 with the pouring spout 16. In any event, once the pouring spout 16 has been opened and the collar 30 connected thereto, the probe 10 is inserted axially through the bore of the pouring spout by depressing the segments 22 and 24. Normally, the first segment 22 is depressed to the limits of its throw, as determined by a seating of the snap ring 66 against the seal 64. Thereafter the quantity of liquid to be extracted determines the distance through which the second segment 24 is extended downwardly from the segment 22. Where the scale 78 is employed, the indicia of the scale indicates the extent to which the segment 24 is depressed. Of course, where the scale is omitted the segment 24 is depressed to any desired depth relative to the container 112.

Once the probe is thus connected with a container 14, a vacuum created within the mixing system, not shown, is applied to the tubing 28. The vacuum thus created and applied causes liquid of the body 14 to enter the ports 42 and pass upwardly through the conduit 44 and into the tubing 28. The tubing 28, of course, conducts the fluid thereto for thus effecting extraction of the liquid from the container 12.

Upon completion of extraction of fluid from the container 12, the fitting 70 is connected with a source of rinse fluid maintained under pressure. Such a connection may be effected through manipulation of a three-port two position valve, not shown, connected to the fitting as aforementioned. The rinse fluid thus introduced now passes axially along the external surface of the second segment 24, as it courses through the jacket 72 to be expelled from the jacket through the ports 68 as radial streams of droplets. These droplets impinge against the internal wall surfaces of the container and function to wash residue of the liquid of the body 14 from the surfaces. Preferably, during the washing of residue from the wall surfaces of the container a vacuum is maintained on the tubing 28 whereby the rinse liquid and residue is siphoned through the ports 42 and delivered to the mixing system. In some instances the head developed by the introduction of the rinse liquid is sufficient to force the rinse liquid through the stinger, in the absence of an applied vacuum, where the segment 24 is open to atmosphere.

Finally, as an optional completion step, the second segment 24 is drawn axially through the jacket 72 while the rinsing fluid is delivered therethrough for purposes of washing the external surface of the segment 24. In such instances, the segment 24 is retracted relative to the segment 22 subsequent to the termination of the flow of water through the jacket. Of course, this step may be eliminated in the event a concern exists for avoiding a deposit of rinse liquid within the container.

In any event, once the operation is completed, the segment 24 is retracted relative to the segment 22 and the segment 22 is then retracted relative to the collar 30. Such retraction occurs as a consequence of tension applied to the upper end portion 26 of the segment 24. Thus the external surface of the segment 24 is encapsulated within the segment 22, and the external surface of the segment 22, previously exposed to the fluid within the container 12, is encapsulated within the barrel 50. Moreover, the ports 42 are closed as the seals 46 and 48 sealingly engage to segment 24 at opposite sides of the ports. Moreover, the barrel 50 is sealed against leakage of the rinse liquid through the port 68 as the annular seal 38 sealingly engages the external surface of the segment 22 bewteen the ports 68 and the end surface 41. While, as a matter of interest, it is noted that the liquid confined within the jacket 72 comprises a rinse liquid and therefor it is unlikely that such a liquid would serve to contaminate should drippage occur, the seals 62 and 64 serve to substantially assure that leakage of rinse fluid from the jacket 72 will not occur once the probe is disconnected from the container.

Finally, it is noted that the pressure relief ports 74 and 76 serve to assure that no excessive pressure, positive or negative, are developed within the container during operation of the probe.

In view of the foregoing, it is believed that the probe of the instant invention provides a practical solution to the perplexing problem of providing a probe which will meet the rigid standards for systems adapted to be employed by handlers of Ag chemicals.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. In a probe adapted to be employed in extracting a liquid chemical from a shipping container characterized by a pouring spout of a tubular configuration having an external thread, the improvement comprising:
   an extensible extraction stinger of a tubular configuration;
   coupling means including a collar concentrically related to the stinger having an internally threaded cavity adapted to receive an externally threaded pouring spout in a threaded relationship, and a bore coaxially related to said cavity for supporting said stinger for reciprocation relative to the cavity adapted to releasably couple the probe to the spout and supporting the stinger for axial extension through said spout into an extraction relation with a liquid chemical confined within the container; and
   means for sealing said stinger prior to the probe being released from the spout.

2. The probe of claim 1 wherein said stinger includes a first and second segment supported in telescopic relation and said coupling means includes means supporting said stinger for substantial retraction from said cavity.

3. The probe of claim 2 wherein said stinger includes means defining in the second segment of said stinger a plurality of extraction ports arranged in an annular array and said means for sealing said stinger includes an annular seal disposed within said first segment for isolating said array of extraction ports from said cavity.

4. The probe of claim 3 wherein said first segment includes means defining a tubular fluid jacket concentrically related to the second segment of said stinger, means adapted to connect the jacket to a source of fluid under pressure, means defining within the jacket an annular array of ports for directing streams of fluid under pressure to impinge against the internal surfaces of the container and the external surfaces of the probe, whereby toxic residue is rinsed therefrom concurrently with extraction thereof from the container.

5. The probe of claim 4 further comprising a stop ring rigidly affixed to said first segment and a tubular cage rigidly connected to said collar in coaxial alignment therewith and concentrically related to said stinger having an annulus at each of its opposite ends for limiting the throw of the stinger relative to said cavity, means defining a plurality of adapter caps, each cap being adapted to be removably connected to said collar for separately coupling a pouring spout thereto, and means including a protuberance of an acuminate configuration projected axially from one end of the first segment for puncturing a closure membrane for a pouring spout.

6. A probe as defined in claim 3 further including means defining a scale extended along the external surface of the second segment for measuring the quantity of liquid chemical extracted from the container.

7. A substantially drip-proof probe adapted to be inserted into a shipping container for toxic fluid and sequentially employed for first extracting toxic fluid from the container, washing residue of the toxic fluid from the internal surfaces of the container, and thereafter extracting the residue from the container, comprising:
   A. an elongated, segmented body of a cylindrical configuration including a first segment of a tubular configuration and a second segment of a tubular configuration telescopically received within the first segment and supported thereby for extension and retraction relative thereto and configured to be secured within a discharge orifice for a shipping container having confined therein a body of toxic fluid, and means for extracting a flowing stream of the fluid from the container including a plurality of radially extended fluid extraction ports defined in one end portion of the second segment, and a fluid conduit communicating with said ports;
   B. means for washing the internal walls of the container including a plurality of ports defining a spray nozzle in one end portion of the first segment of said body, and means adapted to connect the nozzle with a source of rinse liquid maintained under pressure including a fitting axially spaced from said spray nozzle and a conduit of an annular cross sectional configuration extended axially of said body for coupling said nozzle in communication with said fitting; and C. means for preventing drippage of fluid from said probe subsequent to the probe being extracted from said container.

8. The probe of claim 7 wherein said means for preventing drippage includes an annular seal disposed between one end portion of the internal surface of the first segment of the body and the external surface of one end portion of the second segment of said body for isolating said plurality of extraction ports from the external surface of the first segment when the second segment is telescopically retracted relative to the first segment.

9. The probe of claim 8 further comprising a collar adapted to secure said segmented body within the discharge orifice of the container.

10. The probe of claim 7 wherein said means for substantially preventing drippage further includes a seal seated in the collar in contiguous relation with the external surface of the first segment of the body for isolating the spray nozzle from the external surface of the first segment of the body.

11. The probe of claim 7 further comprising venting means connected with the first segment in communication with the nozzle for introducing atmospheric air into the container as a flowing stream is conducted therefrom.

12. The probe of claim 7 further comprising means defining a collar concentrically related to said body and connected thereto in supporting relation therewith for connecting said probe to a pouring spout in an hermetically sealed relation with said container, and means including a vent connected with said body for introducing atmospheric pressure into said container as a stream of fluid is conducted therefrom.

13. The probe of claim 12 wherein said means for substantially preventing drippage includes an annular seal concentrically related to said first segment seated in said collar in friction fit engagement with the external surface of the first segment for accommodating axial displacement of the first segment relative to said collar and an annular seal seated within one end portion of the first segment of the body in friction fit engagement with the external surface of the second segment of the body in circumscribing relation therewith for accommodating axial displacement of the second segment of the body relative to said first segment.

14. The probe of claim 13 wherein said collar includes an axially extended sleeve characterized by both external threads and a fitting received thereby adapted to connect said probe to an external thread of a pouring spout.

15. A substantially drip-proof probe adapted to be inserted into an hermetically sealed container for toxic fluid and employed for sequentially extracting toxic fluid from the container, washing residue of the toxic fluid from the internal wall surface of the container, utilizing a rinsing fluid, and finally extracting rinsing fluid and residue from the container, comprising:

A. an elongated segmented stinger including a first tubular segment and a second tubular segment telescopically received within the first segment supported thereby for axial reciprocation relative thereto;

B. means defining a cap closing one end of said second segment and coupling means for connecting the other end of the segment of a source of vacuum;

C. means including an annular array of fluid extraction ports defined in said second segment in close proximity with said cap;

D. means for closing said ports as the second segment of the stinger is retracted relative to said first segment including a seal of an annular configuration seated in one end portion of said first segment in engagement with the external surface of said second segment for receiving the array of ports in sealing engagement, whereby the ports of the array are closed relative to said probe;

E. means defining a fluid discharge conduit extended from said array of ports into communication with said coupling means for discharging the container for conducting a stream of fluid from the container through said second segment;

F. washing means for washing the internal surfaces of said container with a rinsing fluid including a plurality of ports defined in one end portion of the first segment, each having a radially projected axis, a fitting mounted on the opposite end portion of the first segment in communication with said ports for delivering rinsing fluid under pressure along the internal surface of the first segment to the plurality of ports;

G. means including a venting valve mounted in said first segment for introducing atmospheric pressure into the container via said plurality of ports;

H. means for connecting said stinger to said container including a collar having an annulus for receiving the first segment of the stinger in concentric relation therewith and supporting the first segment for axial reciprocation relative thereto, and a sleeve coaxially aligned with said annular characterized by a screw thread extended along the external surface thereof adapted to receive a threaded pouring spout for a container;

I. means for sealing said plurality of ports including a seal of an annular configuration seated in said first sleeve in engaging relation with the external surface of said first segment for isolating said ports as the first segment is displaced through said annulus; and J. means for limiting displacement of said first segment relative to said collar including means defining a tubular cage having a stop of an annular configuration arranged in axially spaced relation with said annulus and concentrically related with the first segment of the stinger and a snap ring affixed to the external surface of the first segment for alternately engaging said collar and said stop as reciprocating motion is imparted to the stinger.

* * * * *

UNITED STATES PATENT AND TRADEMARK OFFICE
CERTIFICATE OF CORRECTION

PATENT NO. : 4,162,745
DATED : July 31, 1979
INVENTOR(S) : David L. Anderson, Jr.

It is certified that error appears in the above-identified patent and that said Letters Patent are hereby corrected as shown below:

Column 5, line 41, delete "43" and substitute ---48---.

Signed and Sealed this

Twenty-third Day of October 1979

[SEAL]

Attest:

RUTH C. MASON
Attesting Officer

LUTRELLE F. PARKER
Acting Commissioner of Patents and Trademarks